United States Patent
Eberlein

(10) Patent No.: US 9,652,214 B1
(45) Date of Patent: May 16, 2017

(54) PLUGGABLE EXTENSION OF SOFTWARE APPLICATIONS

(71) Applicant: SAP SE, Walldorf (DE)

(72) Inventor: Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/973,751

(22) Filed: Dec. 18, 2015

(51) Int. Cl.
G06F 9/44 (2006.01)
G06F 9/445 (2006.01)

(52) U.S. Cl.
CPC ..................... *G06F 8/61* (2013.01)

(58) Field of Classification Search
None
See application file for complete search history.

(56) References Cited

U.S. PATENT DOCUMENTS

| | | | |
|---|---|---|---|
| 2005/0033728 A1* | 2/2005 | James | G06F 9/44526 |
| 2005/0044524 A1* | 2/2005 | Murray | G06F 9/44526 |
| | | | 717/101 |
| 2005/0149990 A1* | 7/2005 | Fairhurst | H04N 7/163 |
| | | | 725/136 |
| 2005/0262188 A1* | 11/2005 | Mamou | G06F 17/30563 |
| | | | 709/203 |
| 2005/0289535 A1* | 12/2005 | Murray | G06F 8/61 |
| | | | 717/172 |
| 2008/0109801 A1* | 5/2008 | Levine | G06F 8/65 |
| | | | 717/171 |
| 2008/0282255 A1* | 11/2008 | Kawamoto | G06F 11/1438 |
| | | | 719/312 |
| 2009/0282401 A1* | 11/2009 | Todorova | G06F 8/61 |
| | | | 717/175 |
| 2013/0198718 A1* | 8/2013 | Kunze | G06F 8/61 |
| | | | 717/121 |
| 2015/0026673 A1* | 1/2015 | Shetty | G06F 8/61 |
| | | | 717/174 |

* cited by examiner

Primary Examiner — Philip Wang

(57) ABSTRACT

Various embodiments of systems and methods to provide pluggable extensions of software applications are provided herein. In one aspect, plugin application package is received for deployment. The plugin application package includes configuration data to comprising various definitions for the deployment of the plugin application. In another aspect, configuration data of a host software application is updated with at least a part of the configuration data of the plugin application. The host application is reconfigured based on the updated host configuration data to refer to the plugin application. In yet another aspect, one or more plugin services provided by the plugin application are exposed through the reconfigured host application, to handle corresponding user requests.

20 Claims, 7 Drawing Sheets

```
400
                                                                    410

ID: com.sap.host
modules:
    - name: host-router
        type: com.sap.static-content
        domain: host-router.cfapps.neo.ondemand.com      420
        requires:
            - name: host-service
              group: destinations
              properties:
                  name: host-router
                  url: ~{host-url}
    - name: host-app
        type: org.nodejs
        domain: host-app.cfapps.neo.ondemand.com          430
        provides:
            - name: host-service
              properties:
                  host-url: "${default-url}"
        requires:
            - name: host-db
    - name: host-app-db
        type: com.sap.hana.hdi
        provides:
            - name: host-db

440

ID: com.sap.plugin
modules:
    - name: plugin-router
        type: com.sap.static-content
        domain: plugin-router.cfapps.neo.ondemand.com
        requires: plugin-service                          450
        plugin:                              # plugin definition
            hostID: com.sap.host
            hostModule: host-router
            properties:
                name: plugin
                source: "/plugin"
                pluginType: launchpad
    - name: plugin-app
        type: org.nodejs
        domain: plugin-app.cfapps.neo.ondemand.com
        provides:
            - name: plugin-service
```

FIG. 4

```
ID: com.sap.host
modules:
    - name: host-router
        type: com.sap.static-content
        domain: host-router.cfapps.neo.ondemand.com
        requires:
            - name: host-service
              group: destinations
              properties:
                  name: host-router
                  url: ~{host-url}
            - name: plugin-provider          # plugin extension
              group: destinations
              properties:
                  name: plugin-router
                  url: ~{plugin-url}
              group: plugins
              properties:
                  name: plugin
                  source: "/plugin"
                  destination: plugin-router
                  pluginType: Launchpad
    - name: plugin-router
        domain: plugin-router.cfapps.neo.ondemand.com
        provides:
            - name: plugin-provider
              properties:
                  plugin-url: "${default-url}"
    - name: host-app
        type: org.nodejs
        domain: host-app.cfapps.neo.ondemand.com
        provides:
            - name: host-service
              properties:
                  host-url: "${default-url}"
        requires:
            - name: host-db
    - name: host-app-db
        type: com.sap.hana.hdi
        provides:
            - name: host-db
```

```
destinations: [
    {"name":"host-router",
     "url":"http://host-app.cfapps.neo.ondemand.com"},
    {"name":"plugin-router",                    # plugin configuration
     "url":"http://plugin-router.cfapps.neo.ondemand.com"}
]
plugins: [
    {"name":"plugin",
     "source":"/plugin",
     "destination":"plugin-router",
     "pluginType":"Launchpad"}
]
```

540

550

```
"routes": [
    {"source":"/host",
     "destination:":"host-router"},
    {"source":"/plugin",                        # plugin route
     "destination:":"plugin-router"}
]
```

560

570

```
{"name":"plugin",
 "source":"/plugin",
 "pluginType":"Launchpad"}
```

PLUGGABLE EXTENSION OF SOFTWARE APPLICATIONS

BACKGROUND

Modern software application architectures embrace microservices design pattern that decomposes monolithic applications into independently deployable services. This approach provides a high degree of flexibility and efficiency, e.g., by reuse of similar services. The advantages that microservice architecture provides are especially noticeable when implemented in cloud environments where they are operated by the development teams (DevOps model). The developed and deployed services can be extended with small local configuration changes, and rewired to integrate with new services to deliver additional functionality.

However, when applications are deployed by customers in a more traditional way, e.g., as packaged applications, the benefits of microservice architecture do not pay off immediately. To extend the functionality of such applications by adding new services would require code changes and reconfiguration of execution environments. Alternatively, such extensions need to be foreseen so they can be plugged in later by just changing implicitly the configuration of the corresponding execution environments. Thus, no manual rewiring would be needed that would require expert knowledge about the inner structure of the deployed applications. However, foreseeing what future functionality would be added to the deployed applications is not always possible.

BRIEF DESCRIPTION OF THE DRAWINGS

The claims set forth the scope with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

FIG. 4 illustrates the contents of a host application descriptor and a plugin application descriptor, according to one embodiment FIG. 5A illustrates the contents of an extended application descriptor, according to one embodiment.

FIG. 5B illustrates additional configurations resulting from pluggable extension of microservices applications, according to one embodiment.

DETAILED DESCRIPTION

Embodiments of techniques for pluggable extension of software applications are described herein. In the following description, numerous specific details are set forth to provide a thorough understanding of the embodiments. One skilled in the relevant art will recognize, however, that the presented ideas can be practiced without one or more of the specific details, or with other methods, components, materials, etc. In other instances, well-known structures, materials, or operations are not shown or described in detail to avoid obscuring.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

Generally, a software application or a product built upon microservices architecture encompasses a number of independently deployable software components, where the different components provide different services. Accordingly, the different components may have separate lifecycles, independent from each other. For example, one component may be provided and/or managed by one design and/or support team, while another component may be handled by another team. That approach ensures more efficient development and maintenance of the different components and the corresponding services. However, this flexibility and efficiency is not so evident in private cloud and on-premise scenarios, where no dedicated teams are available to handle the different services. The below described techniques for pluggable extension of microservices applications overcome the aforementioned shortages of such scenarios.

Figure 1:
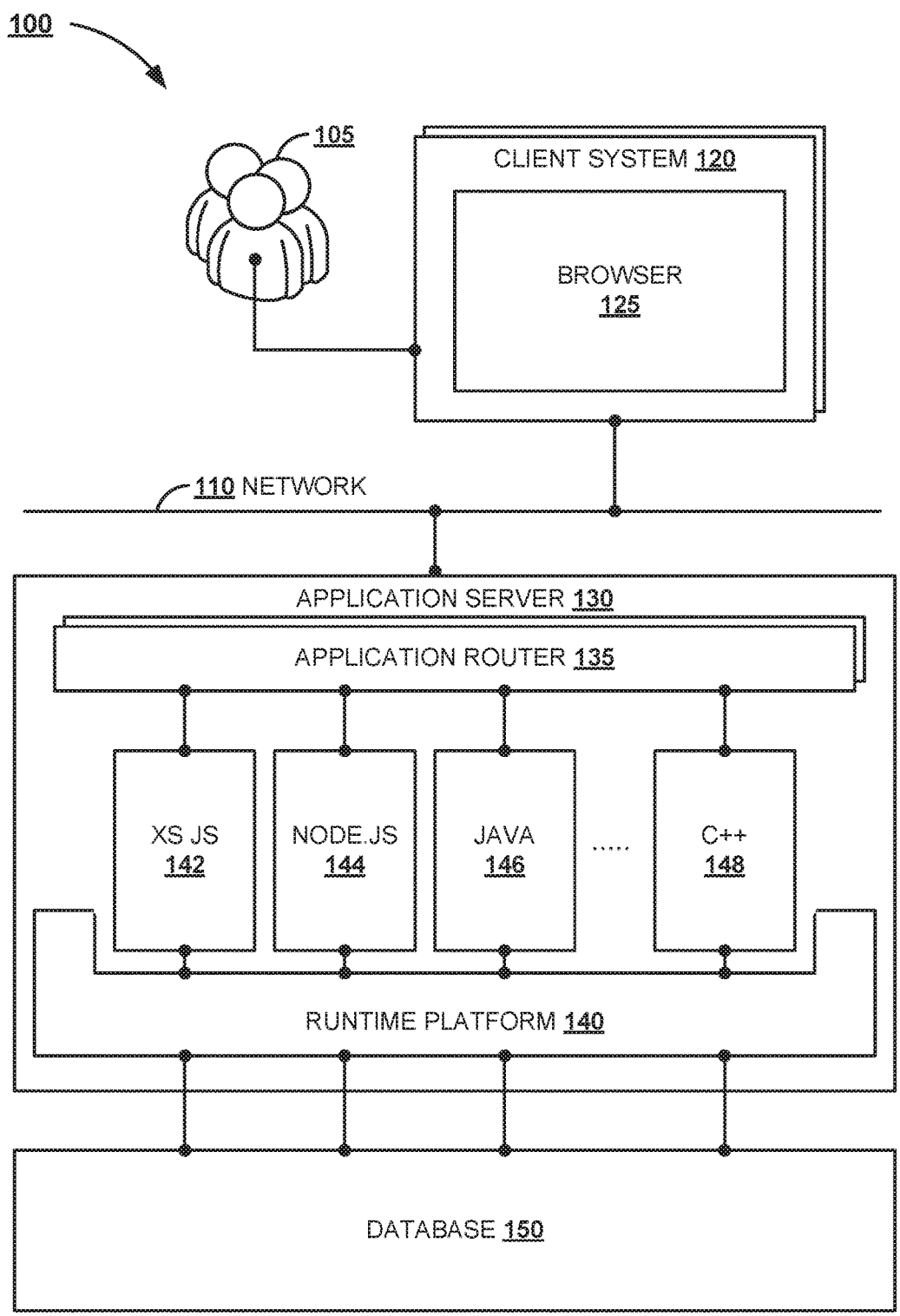
FIG. 1 is a block diagram illustrating a computer environment of extendable software applications, according to one embodiment.

FIG. 1 illustrates computer system environment 100 where software applications or products could be extended by automatically plugging new services based on microservices architecture, according to one embodiment. System environment 100 represents a simplified example based on a solution provided by SAP SE company. However, similar functionality may be achieved by alternative solutions provided by other vendors, and structured differently, e.g., using different modules. An advantage of the presented system landscape is the provisioning of software applications runtime environment that could be implemented on both cloud and on-premise landscapes. Thus, same applications, extendable through pluggable components, can be marketed either as services or as products, or both, depending on customer needs.

In system environment 100, one or more shareholders or users 105 (e.g., developers, system administrators, end users, etc.) operate on one or more client systems 120. Users 105 may request different services or execute various operations available within client systems 120. The requested services could be provided by one or more server systems 130 via network 110. The illustrated one or more server systems 130 represent one or more backend nodes or application servers in the computer system environment 100, e.g., clustered or not. In the context of SAP SE system landscape, application server 130 could be HANA XS® (HANA® eXtended application Services) application server, providing a platform for running applications accessing HI-ANA in-memory database (HANA DB®), e.g., database 150. Users (105) can access the functionality of the applications running on application server 130 via browser 125, for example. Alternatively, dedicated client applications running on client system 120 may be utilized (e.g., various mobile apps).

Application server 130 could be based on micro services architecture (e.g., HANA XS), and oriented towards hosting cloud-type applications. For example, the application server 130 could implement runtime platform 140 as a cloud-based computing platform, such as Cloud Foundry® originally developed by VMWare, Inc. company. In one embodiment, runtime platform 140 is an on-premise solution built upon Cloud Foundry open-source cloud platform (e.g., HANA XS runtime platform), to provide various frameworks to deploy cloud-based application services on-premise. As illustrated in FIG. 1, runtime platform 140 may support multiple runtimes such as XS JavaScript 142 (SAP SE specific), Node.js® 144, Java® 146, C++® 148, etc.

Various applications may run simultaneously, together or independently, on one or more of the supported runtimes (142-148), to provide a number of application services at application server 130. In the common scenario, a user (105) accesses an application user interface (UI), e.g., in a browser (125) at a client system (120) to request a particular service. The submitted service request is provided at an application server (130), e.g., via a public or a private network (110), where a router, such as application router 135, identifies an application that could handle the request and calls the application at the corresponding runtime (142, 144, 146 or 148) of a runtime platform (140) for processing. In one embodiment, application router (e.g., 135) may be a routing service that dispatches client requests directed to an application package to particular application services implementing requested functionality. In one embodiment, different instances of the application router service may be instantiated, e.g., to subordinate in dispatching application requests.

Figure 2:
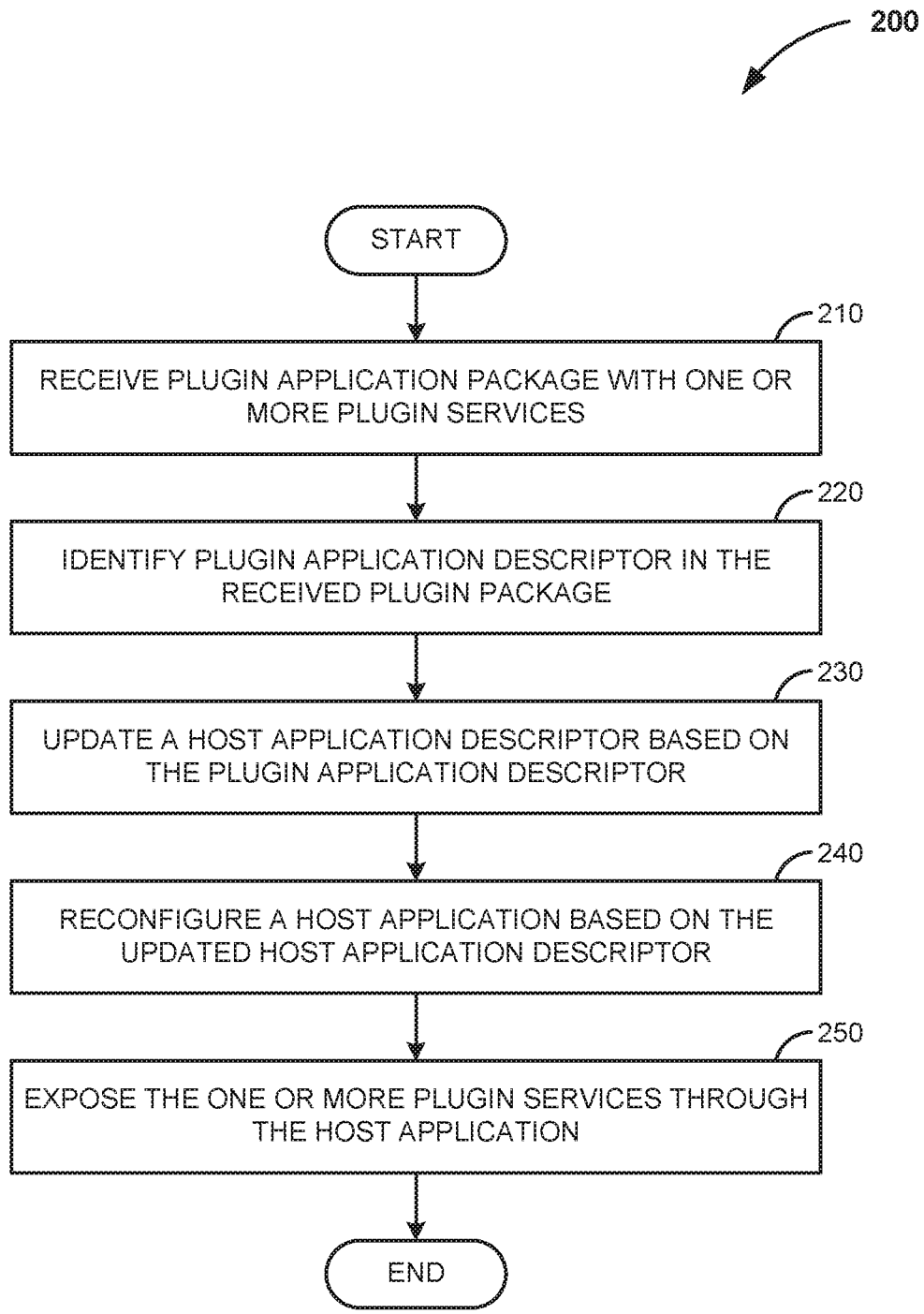
FIG. 2 is a flow diagram illustrating a process to provide pluggable extension of microservices applications, according to one embodiment.

In one embodiment, the functionality available at the application server could be further enhanced by deploying additional services (e.g., application components). The traditional deployment of new applications on-premise to extend the functionality of a product requires a number of manual expert activities, such as repackaging of the product source files with the additional functionality, updating the configuration metadata with the configuration information of the new applications to wire up the new services into the product, and subsequently, redeployment or reinstalling of the extended product. Obviously, this require significant development and/or administrative knowledge and efforts, which normally is not available at customer premises. Therefore, an automated mechanism is implemented in application server 130 to ensure the identification and the calling of the additional services, when requested. An overview of this mechanism is provided in the context of FIG. 2 illustrating a process 200 to provide pluggable extension of microservices applications, according to one embodiment.

The description of process 200 is based on an assumption that the microservices applications architecture is deployed in an on-premise computing environment. However, similar techniques may be used when extending the functionality of software products in public and private cloud environments. For example, even when developers and support specialists are available to deploy a new functionality in a public cloud environment, it is still more efficient to apply the described mechanism for automated pluggable extension of the microservices applications. Private cloud scenarios are similar to the implementation of additional functionality on-premise, as the process is handled by customers or tenants, in private cloud based computing system environments.

At 210, a plugin application package is received. The package may include one or more services to enhance the functionality of an already implemented software product. For example, a customer of a particular product may license additional functionality, e.g., access to further modules of the product. Thus, the corresponding vendor may send or provide access for downloading the installable package of the new functionality (the plugin application package) to the respective customer, e.g., when the product is installed on-premise.

Together with the programming code, the plugin application package may include configuration information or metadata necessary for establishing the execution environment for the pluggable services, e.g., wiring the pluggable service in the corresponding runtime environment. In one embodiment, such metadata is provided as a separate file, e.g., plugin application descriptor, and is included in the deployable package. Alternatively, the plugin configuration and wiring metadata could be provided in the form of annotations of the programming code, could be separately sent or downloadable, etc. At 220, the plugin application descriptor is identified in the received plugin application package. In one embodiment, the plugin application descriptor includes a definition of the plugin application.

The software application or product to be extended with the plugin application may have been also delivered as a deployable package, e.g., a host application package, according to one embodiment. The host application package may contain the source or executable code of the software application to be deployed, as well as the metadata required for the setup and configuration of the software product within the runtime environment. Similarly to the plugin application package, the host configuration data could be provided in a separate host application descriptor. When the plugin application descriptor is identified, an automatic update of the host application descriptor based on the plugin metadata may be performed at 230. For example, the update may be performed by a built in functionality of the deploy mechanism of the runtime platform, or by a separate service available at the application server. The update may be triggered automatically and/or by a user, and may not involve further manual interactions. The update may add the registrations and the definitions of the plugin service or application to the definitions of the host application or product.

At 240, the host application is automatically reconfigured based on the updated host application descriptor, according to one embodiment. The reconfiguration may involve various changes to the host application package, to ensure wiring of the plugin application to the software product in the runtime environment. For example, the new functionality provided by the plugin application is included in the host application descriptor with the appropriate references. Thus, when the new functionality is requested, the software product would route it to the plugin application for handling. This wiring of the plugin application in the runtime environment and exposing the plugin service through the host application is provided at 250.

In one embodiment, the plugin definition that comes with the plugin application descriptor may be enhanced with configuration data determined when the plugin is deployed. This information may be then injected into the configuration of the host application package to register the plugin with the extended application. This enables the host application package to reconfigure its execution under consideration of the newly added plugin to provide additional functionality. This functionality can then be accessed by exposing plugin services through the host application package.

There may be different approaches in exposing the plugin application functionality, as well as different elements of this exposing. From user's perspective, the new functionality may become available in the graphical user interface as a separate selectable option, e.g., part of the software product.

The new selectable option may be placed in a common software application launchpad, for example. There may be other options for integrating the extended functionality into the software product. For example the new functionality may be automatically applied, e.g., in reporting UIs, and so on.

Taking a specific software product, e.g., HANA Foundation for Health, a customer may initially acquire and install the generic business application, and subsequently enhance the basic functionality with various plugins (e.g., provided and installed as microservices). The customer may want to add and use some of the available plugins, such as Genome Analysis, which is available as a separate application plugin to the HANA Foundation for Health product. Thus, by the described automated deployment of the pluggable application, the new functionality would be available to the users without manual reset and redeployment of the whole product.

The added application plugins should be wired up with the product. Thus, the product processes are aware about the added functionality and how to provide it, e.g., allow access to this functionality through the product or in cooperation with the product. This may be achieved by extending the metadata (e.g., configuration files and/or annotations), updating the environment variables by altering the existing ones and/or adding new variables corresponding to the plugin applications, etc.

From architectural perspective, the deployed applications typically have one central entry point from a user standpoint. In other words, a browser may connect to one location, e.g., one server or router (including a proxy), with one logon, one central security session. There may be different reasons for this, mostly based on the web application security model principles, e.g., same-origin policy. According to this, users' service requests are delivered at the single end point of the software product. Behind this one endpoint, requests may be forwarded to different backend services. The single end point could be referred to as application router (e.g., application router 135 in FIG. 1).

The application router may be configured to "know", e.g., depending on a uniform resource locator (URL) in a client's request, where to forward this request for handling (alternatively, the application router may dedicate a HyperText Markup Language (HTML) page to serve the request itself). Such application proxy configuration for a software product is provided by the configuration metadata, e.g., host application descriptor. Since the client cannot access through the UI (e.g., in the browser) the extended functionality directly, through a separate endpoint, no other application router may be available for direct access. Accordingly, the metadata of the plugin application descriptor is integrated in the host application descriptor.

Figure 3:
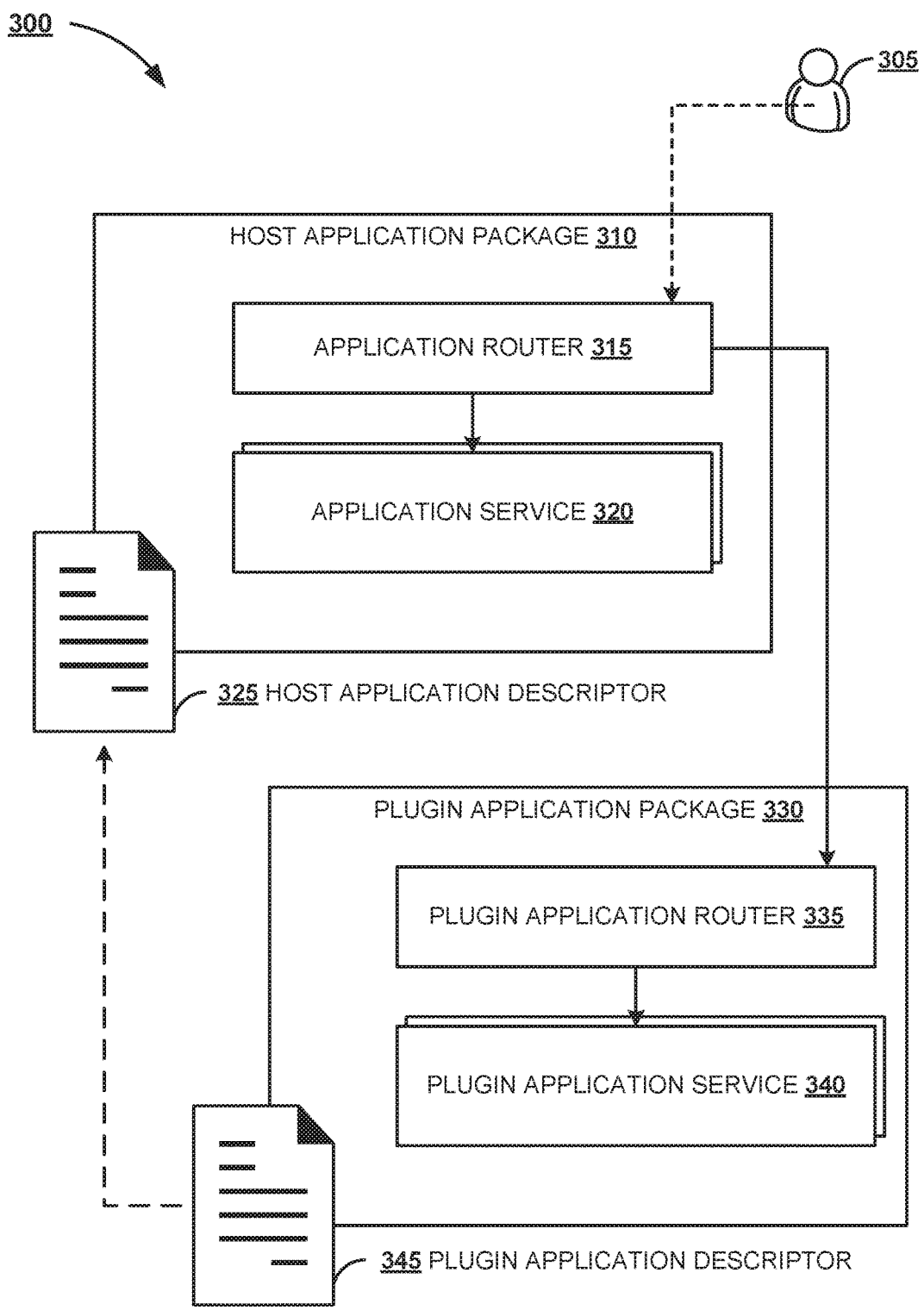
FIG. 3 is a block diagram illustrating a system architecture implementing application plugin extension of a software product, according to one embodiment.

FIG. 3 shows simplified system architecture 300 implementing application plugin extension of a software product, according to one embodiment. Application router 315 acts as a single endpoint for host application package 310. As such, the application router 315 receives the service requests, e.g., sent by user 305 via client system and network (not illustrated), and dispatches them to the appropriate application service 320. The routing is based on the definitions provided in host application descriptor 325.

Plugin application package 330 extends the functionality of the host application package. Similarly, the requests for the plugin application services 340 are dispatched by plugin application router 335 based on the definitions in plugin application descriptor 345. However, these requests may not be provided by the user (e.g., 305) directly at the plugin application router 335, since the enhanced software product has only one endpoint at the application router 315. Therefore, the application router 315 should be aware that such requests should be forwarded to the plugin application router 335. In one embodiment, this is achieved by registering or injecting plugin configuration information to the host application package, e.g., from the plugin application descriptor 345 to the host application descriptor 325. The wiring of the plugin services may also include adding references, e.g., to the host application descriptor, that can be used by the application services (320) to call directly the plugin services (340) when necessary (not illustrated).

As it was mentioned, the host application descriptor and the plugin application descriptor could be separate files in a particular format to provide the configuration metadata used for setting up the runtime environments for the corresponding application services. The formats of these files could be, for example, plain text formats, structured files, etc. The structured files may correspond, for example, to some table form. In the flat files, special language for defining and/or tagging the metadata may be used, for example, eXtensible Markup Language (XML). Alternatively, the configuration metadata could be provided in other forms, e.g., as annotations in the source code, database references, references to external resources, etc.

FIG. 4 shows the contents of host application descriptor 410 and plugin application descriptor 440, according to one embodiment. The configuration information in the descriptors (410 and 440) could be provided in separate files, formatted according to an adopted convention, e.g., similar to XML in this case. The host application package (e.g., 310 in FIG. 3) has its own application descriptor (e.g., 325), defining its internal structure and dependencies. In the example host application descriptor 410 illustrated in FIG. 4, host application package with identifier (ID) "com.sap.host" has three components or modules, "host-router", "host-app" and "host-app-db." The "host-router" routes requests for processing to the "host-app", which turns to the "host-app-db" to store and/or access data.

As illustrated, the configuration presented with 410 links the different components of the host application package by pointing out the required and provided services. For example, "host-router" component is defined to require "host-services" service (see 420). Correspondingly, "host-service" service is provided by "host-app" module (see 430). Similarly, "host-app" module requires "host-db" service, which is provided by "host-app-db" component of the host application package. Based on the configuration and the wiring of the different modules, when a request for the "host-service" is received at the "host-router", the request is forwarded to the "host-app" implementing and providing the "host-service". The definitions in 410 also show a wiring example of how the destination for the "host-service" is defined as "host-url", and "host-url" is further defined as "default-url" in the context of the "host-app" module. The "default-url" may be a special key word showing that "host-service" is deployed at the default (host) URL. This is where the requests for this particular service should be forwarded to execution.

In FIG. 4, 440 illustrates an exemplary contents of a plugin application descriptor. Similarly to the host application descriptor (e.g., and using the same syntax), the host application descriptor defined that a plugin application package with the ID "com.sap.plugin" has two components, "plugin-router" and "plugin-app". The "plugin-app" may provide a service, e.g., "plugin-service", required at and referred to by the "plugin-router". Therefore, a package internal dependency is modeled (e.g., "requires: plugin-service") and resolved for wiring (e.g., "provides: -name: plugin-service"). In the plugin application descriptor example 440, no modules requiring or providing database services are included, but such can also be added. Another element of the descriptor is the definition of the plugin properties, such as "name" set to "plugin", "source" ("/plugin"), "pluginType" ("Launchpad"), "destination" ("plugin-router").

In one embodiment, application descriptors define only those dependencies and configurations the application package is aware of. If a plugins is added to a host application package, the wiring between package internal components needs to be extended to components from the plugin application package. Additionally, plugins come with configuration that needs to be injected into the host application's configuration so it can react on the availability of the plugin in a concrete deployment and embed it appropriately. For such reasons, the plugin application descriptor in the plugin application package is extended by a section 450 for the plugin definition. The plugin-router module should be wired to the component "hostModule" in the application package with ID "com.sap.host" ("hostID"). Accordingly, the properties the plugin defines in its plugin application descriptor (440) are used for registration of the plugin in the host (e.g., injected to the host application descriptor 410).

In one embodiment, when the plugin application package is registered, the host application package configuration is extended with the plugin definitions, e.g., provided with the plugin application descriptor (or otherwise). Semantically, based on the descriptors 410 and 440 in FIG. 4, the result is an extended host application descriptor illustrated with 510 in FIG. 5A. The derived descriptor (510) may be the actual runtime configuration of the host application package, replacing the original one (410), e.g., after extending the software product functionality. In the illustrated example, section 520 in 510 shows the extension of the original application descriptor of the software product, and results from the injection of the configuration data from the plugin application descriptor (e.g., 440).

When the host application package provided with the merged configuration including the data from the plugin registration is deployed, it is reconfigured to leverage the additional functionality from the plugin. For the provided example, this means that in the "host-router" the predefined route and destination to the "host-service" needs to be extended by another route and destination to the "plugin-router". Such extended routing is shown in FIG. 5B, where additional configurations are generated based on or in connection with the converging of the host application descriptor and the plugin application descriptor. The definition of destinations for the extended software product are illustrated with the configuration snippets in 530, where section 540 specifies the definitions provided by the plugin metadata, according to an embodiment. These snippets provide concrete values (e.g., physical URLs) for the logical destinations of the "host-router" and "plugin-router".

Properties and/or environment artefacts or variables for the plugin are also defined. For example, the "pluginType" is set to "Launchpad" which most likely corresponds to adding the plugin functionality as a separate option, accessible from the Launchpad of the software product (host application). An extended routing may be defined using configuration data, e.g., provided by the plugin application descriptor, as illustrated with the snippets in 550, where section 560 shows the new route. Based on the definitions in 550, an updated touting table may be generated and referred by the application router during runtime, to select the right route for the service requests.

There may be several options regarding how to expose additional functionality provided by plugins through host applications. For example, a host application service can call a plugin application service peer-to-peer in its internal implementation of basic functionality that thus gets extended. The examples provided with this description present another common option of routing client requests directly to the plugin, without invoking a host application service first. In this scenario the host application does not need to prepare for pluggability. Accordingly, the generic application router components are re-configured with appropriate routes. Then, it is up to a client, typically running in a browser, to make the corresponding requests that are directed either to the host or the plugin. Additionally, a direct request to a plugin application router may not work, e.g., because of single endpoint and/or same-origin policy restrictions. Therefore, the host application router may act as a reverse proxy.

To enable the client application to detect the additional functionality and the routes, under which it is accessible, the application router may expose the registered plugins in a list as web resources. The list may be compiled from the properties in the plugin definitions introduced in the plugin application descriptors. In FIG. 5, 570 shows a specific extraction of the plugin definitions, also included in 530, as well as in 510 (FIG. 5A) and 440 (FIG. 4).

The techniques for pluggable extensions of packaged microservices applications enables host application packages to be extended as simply as automatically applying or altering configuration, with no manual interventions to the code or to the metadata definitions. In one embodiment, this configuration may be performed implicitly, when extensions are deployed, without subsequent manual rewiring that would require deeper knowledge about the inner workings of the applications. Such flexibility allows building of applications based on microservices design pattern that are suited for cloud deployment and could be also shipped to on-premise customers without compromising simplicity of operations. Furthermore, the described techniques could be used also for hierarchically extending applications, e.g., when a plugin service is added to a previously plugged application.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
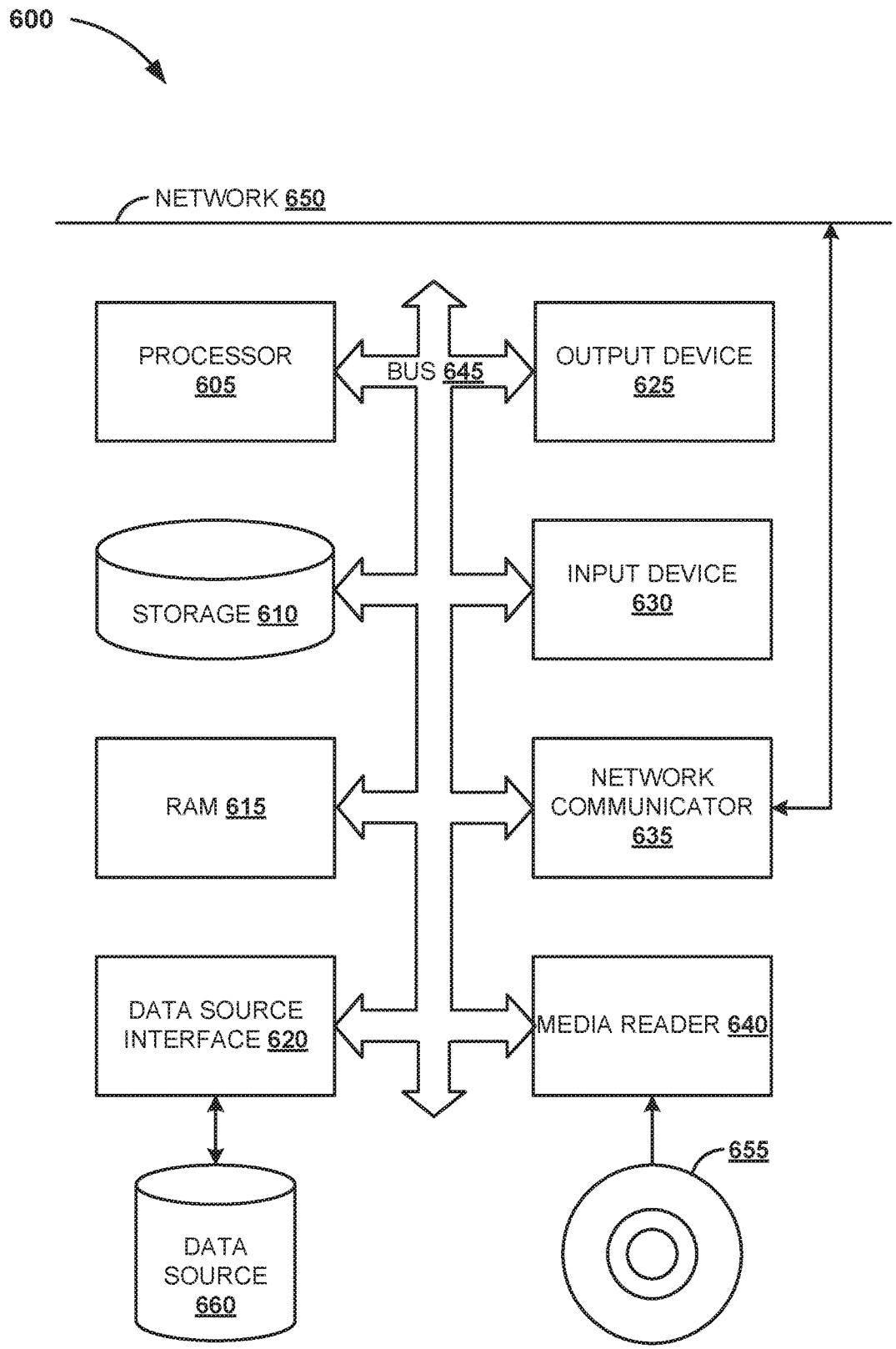
FIG. 6 is a block diagram of an exemplary computer system to execute computer readable instructions for pluggable extension of software applications, according to one embodiment.

FIG. 6 is a block diagram of an exemplary computer system 600. The computer system 600 includes a processor 605 that executes software instructions or code stored on a computer readable storage medium 655 to perform the above-illustrated methods. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed via network 650. In some embodiments the data source 660 may be accessed by an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the presented embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limiting to the precise forms disclosed. While specific embodiments and examples are described herein for illustrative purposes, various equivalent modifications are possible, as those skilled in the relevant art will recognize. These modifications can be made in light of the above detailed description. Rather, the scope of the specification is to be determined by the following claims, which are to be interpreted in accordance with established doctrines of claim construction.

What is claimed is:

1. A computer system to provide pluggable extensions to software products, the system comprising:
  a memory to store computer executable instructions; and
  a processor to execute the instructions stored in the memory to:
    receive a plugin application descriptor including configuration definitions for a plugin software application, wherein the plugin software application is providing one or more additional services to a software product;
    automatically update a host application descriptor with at least a part of the plugin application descriptor, wherein the host application descriptor includes configuration definitions for a host software application, wherein the host software application is providing basic functionality to the software product;
    automatically reconfigure the host software application based on the updated host application descriptor; and
    expose the one or more additional services through the host software application.

2. The system of claim 1, wherein receiving the plugin application descriptor comprises:
  receiving a plugin application package including the one or more additional services provided by the plugin software application; and identifying the plugin application descriptor in the plugin application package.

3. The system of claim 1, wherein automatically updating the host application descriptor comprises:
generating a reference to the plugin software application to wire the plugin software application with the host software application.

4. The system of claim 3 further comprising:
embedding a reference to one or more additional services provided by the plugin software application, based on the plugin application descriptor.

5. The system of claim 1, wherein reconfiguring the host software application comprises:
deploying a host application package including the updated host application descriptor.

6. The system of claim 1, wherein exposing the one or more additional services comprises:
at the host software application, receiving a request for a service of the one or more additional services provided by the plugin software application; and
routing the received request to the plugin software application based on the updated host application descriptor.

7. A non-transitory computer-readable medium to store instructions, which when executed by a computer, cause the computer to perform operations comprising:
receive plugin configuration data including definitions for a plugin software application, wherein the plugin software application provides at least one plugin service extending the functionality of a host software application;
automatically update host configuration data with at least a part of the plugin configuration data, wherein the host configuration data includes definitions for the host software application, wherein the host software application provides at least one basic service;
reconfigure the host software application based on the updated host configuration data; and
expose the at least one plugin service and the at least one basic service through the host software application.

8. The non-transitory computer-readable medium of claim 7, wherein receiving the plugin configuration data comprises:
receiving a plugin application package including the at least one plugin service provided by the plugin software application; and
identifying the plugin configuration data in the plugin application package.

9. The non-transitory computer-readable medium of claim 8, wherein identifying the plugin configuration data comprises:
locating a plugin application descriptor in the plugin application package, wherein the plugin application descriptor includes the plugin configuration data.

10. The non-transitory computer-readable medium of claim 7, wherein automatically updating the host configuration data comprises:
generating a reference to the plugin software application to wire the plugin software application with the host software application.

11. The non-transitory computer-readable medium of claim 10 to store instructions, which when executed by the computer, cause the computer to execute operations further comprising:
embed a reference to the at least one plugin service provided by the plugin software application based on the plugin configuration data.

12. The non-transitory computer-readable medium of claim 7, wherein reconfiguring the host software application comprises:
deploying a host application package including the updated host configuration data.

13. The non-transitory computer-readable medium of claim 7, wherein exposing the at least one plugin service comprises:
at the host software application, receiving a request for the at least one plugin service; and
routing the received request to the plugin software application based on the updated host configuration data.

14. A computer implemented method to deploy pluggable extensions to software products, the method comprising:
receiving plugin configuration data including definitions for a plugin software application;
automatically updating host configuration data with at least a part of the plugin configuration data, wherein the host configuration data includes definitions for a host software application;
at a computer, a processor reconfiguring the host software application based on the updated host configuration data; and
exposing the plugin software application through the host software application.

15. The method of claim 14, wherein receiving the plugin configuration data comprises:
receiving a plugin application package including one or more plugin services provided by the plugin software application; and
identifying the plugin configuration data in the plugin application package.

16. The method of claim 15, wherein identifying the plugin configuration data comprises:
locating a plugin application descriptor in the plugin application package, wherein the plugin application descriptor includes the plugin configuration data.

17. The method of claim 14, wherein automatically updating the host configuration data comprises:
generating a reference to the plugin software application to wire the plugin software application with the host software application.

18. The method of claim 17 further comprising:
embedding a reference to one or more plugin services provided by the plugin software application based on the plugin configuration data.

19. The method of claim 14, wherein reconfiguring the host software application comprises:
deploying a host application package including the updated host configuration data.

20. The method of claim 14, wherein exposing the plugin software application comprises:
at the host software application, receiving a request for a service provided by the plugin software application; and
routing the received request to the plugin software application based on the updated host configuration data.

* * * * *